UNITED STATES PATENT OFFICE.

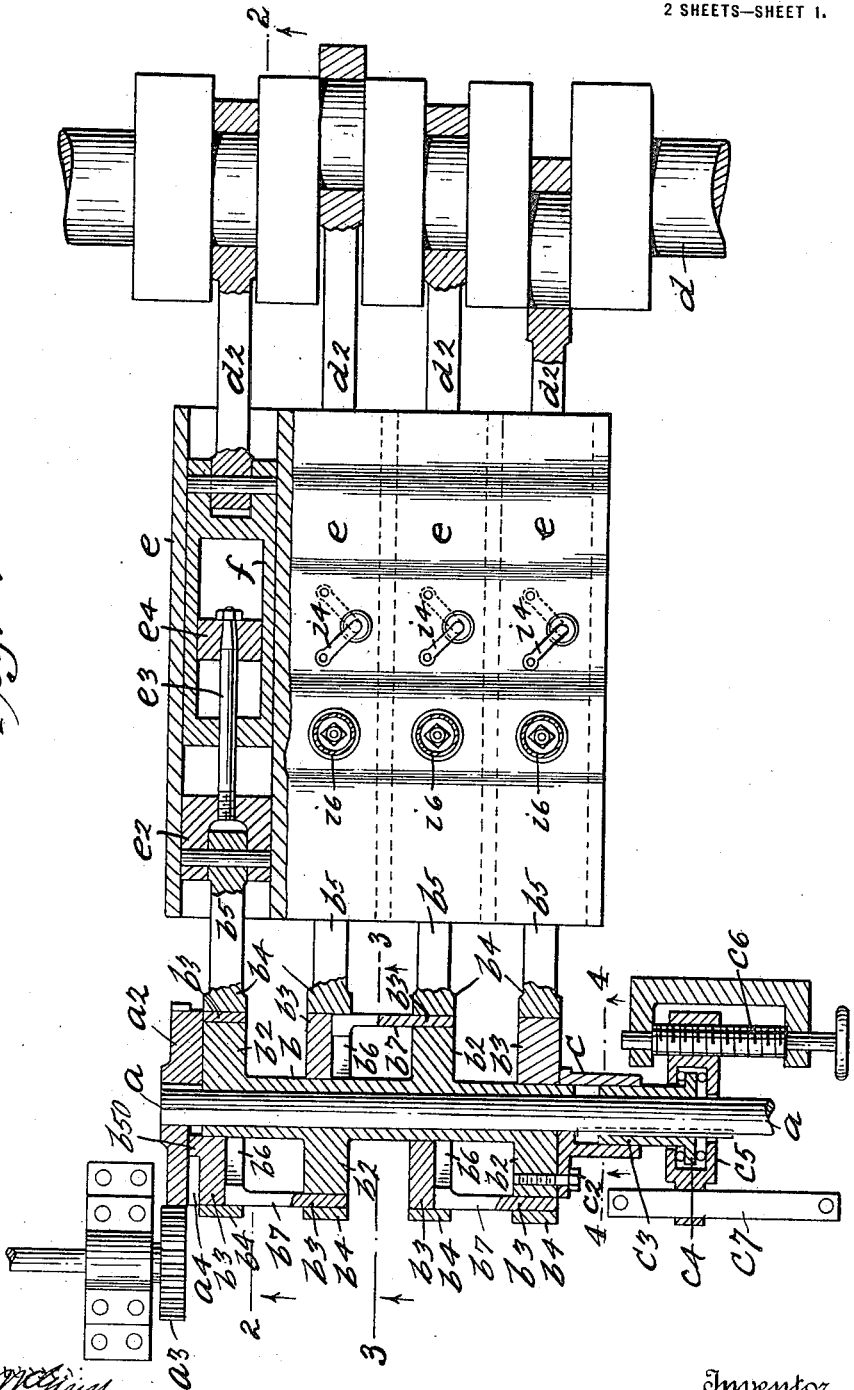

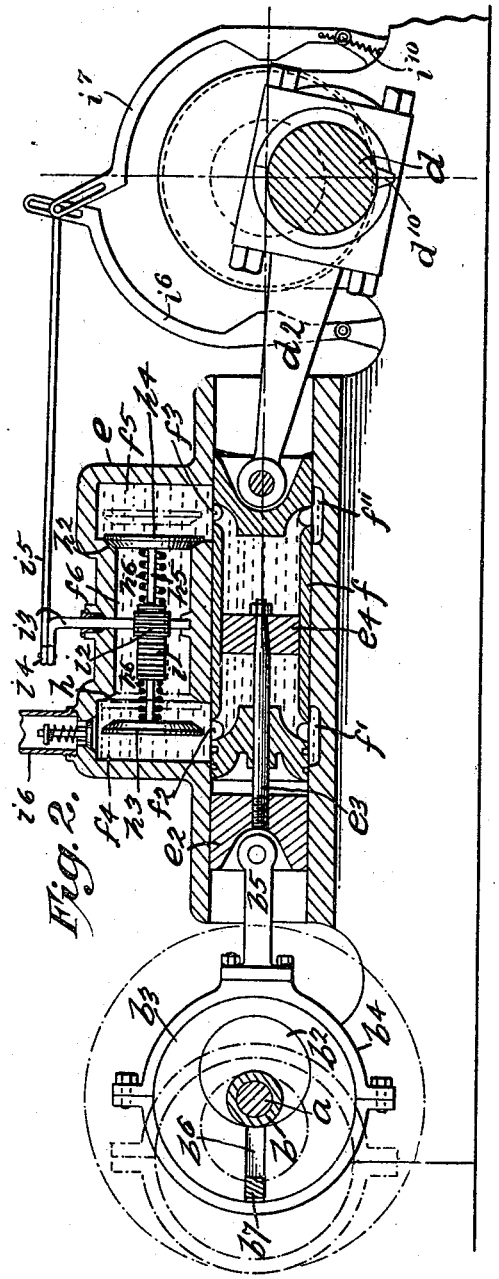

RICHARD S. M. MITCHELL, OF EAST ORANGE, NEW JERSEY, ASSIGNOR, BY MESNE ASSIGNMENTS, TO MOTTLAU TRANSMISSION, INCORPORATED, A CORPORATION OF NEW YORK.

MECHANICAL MOVEMENT.

1,195,381.  Specification of Letters Patent.  Patented Aug. 22, 1916.

Application filed October 30, 1913.  Serial No. 798,190.

*To all whom it may concern:*

Be it known that I, RICHARD S. M. MITCHELL, a citizen of the United States of America, and residing at East Orange, in the county of Essex and State of New Jersey, have invented certain new and useful Improvements in Mechanical Movements, of which the following is a specification, such as will enable those skilled in the art to which it appertains to make and use the same.

This invention relates to mechanical movements designed for various uses but which, in the present showing, is adapted to power transmission devices, particularly of variable degrees of transmission.

The invention proper consists of a fluid reservoir within which are arranged a movable, ported, cylinder, a movable piston therein, a duplex valve arrangement for controlling the flow of fluid through the cylinder ports, on either side of the piston to secure opposite results, and means, exterior of the reservoir, for valve operation at desired or predetermined periods, said means being automatic in action on the valve if desired.

Fluids have heretofore been used as transmitting means within piston cylinders, but my invention provides a reservoir for fluid in bulk and a valve arrangement in the bulk of the fluid, distinct from the cylinder and piston, which avoids any necessity for either cylinder or piston valves and which seals a portion of the fluid within the cylinder on each side of the piston, alternately, whereby movement of either cylinder or piston, in a direction corresponding to the position of the sealed fluid, insures corresponding movement of the other, this arrangement greatly simplifying the construction and, because of such simplicity, insuring more positive operation and less opportunity for derangement of parts.

My invention is fully set forth in the following specification, of which the accompanying drawings form a part, in which the separate parts are designated by the same reference characters in each of the views, and in which:—

Figure 1 is a plan view of one form of adaptation of my invention to power transmission devices, partly in section; Fig. 2 is a section on the line 2—2 of Fig. 1; Fig. 3 is a section on the line 3—3 of Fig. 1; Fig. 4 is a section on the line 4—4 of Fig. 1, enlarged; and Fig. 5 is an enlarged, detached, view of a detail of the construction.

In the drawings forming a part of this application I have shown a shaft $a$ constantly driven at a desired speed by means of gears $a^2$ and $a^3$ or in any other desired manner, the gear $a^2$ being keyed to said shaft and being provided with a radial slot $a^4$ on one side. Freely rotatable on the shaft $a$ is a sleeve $b$ which carries a plurality of eccentric disks $b^2$, four in number in the drawing, preferably integral therewith, and revolubly mounted on each of the eccentric disks is a disk $b^3$ normally concentric with the shaft $a$, and each of the disks $b^3$ is encircled with an eccentric strap or band $b^4$ and to each of which is connected a rod $b^{50}$.

The disk $b^3$ closely adjacent the gear $a^2$ has a lug $b^5$ thereon which enters and is slidable in the slot $a^4$ whereby rotation of the gear insures rotation of the disk $b^3$, and three of the disks are each provided with a radial slot $b^6$ adapted to engage, slidably, an arm or projection $b^7$ on the forwardly adjacent disk $b^3$, this being clearly shown in Fig. 1, and the arrangement of eccentric disks $b^2$ and concentric disks $b^3$ is staggered with respect to the shaft $a$ when viewed in plan for a reason hereinafter pointed out, but it will be seen from the foregoing that all the eccentrics $b^2$ revolve in unison because of their integral formation on the sleeve $b$, and all the concentric disks $b^3$ revolve in unison because of the slot and arm connection, and they also revolve with the shaft $a$ by reason of the positive connection with the gear $a^2$, but there is no direct connection between the disks $b^2$ and $b^3$, nor between the disks $b^2$ and the shaft $a$.

Secured to the most forwardly of the disks $b^2$ is a tubular member $c$, by means of bolts or screws $c^2$, and the interior of which is so formed as to engage the hexagonal, spiral exterior of a sleeve $c^3$, clearly shown in Fig. 5, longitudinally slidable but not revolubly keyed to the shaft $a$, the hexagonal formation revolving the sleeve $c^3$ and member $c$ together but the spiral or helical arrangement permitting a revoluble adjustment of the member on the sleeve when the latter is moved longitudinally of the shaft $a$, thus permitting a revoluble adjustment of the eccentric sleeve $b$, and of the eccentric disks thereon, with respect to the shaft $a$, but the rotation of the shaft carries the eccentric disks with it because of the inability of the tubular member $c$ to revolve independently of the sleeve $c^3$ and the fact that the said sleeve is keyed to the shaft, but the eccentric disk adjustment is possible whether the shaft is rotating or not as such adjustment is performed by the movement of the sleeve $c^3$ along the shaft.

The sleeve $c^3$ is flanged on its forward end, $c^4$, which flange is engaged within a slide $c^5$, preferably anti-frictionally, and is freely revoluble therein, and said slide $c^5$ is movable longitudinally of the shaft $a$ by means of a worm $c^6$, a guide $c^7$ being also provided for said slide and it will be understood that when the worm is rotated in either direction the eccentric disks $b^2$ are revolved about but independently of the shaft and throw the disks $b^3$ into a position correspondingly eccentric, the full degree of such eccentric adjustment being clearly shown in dotted lines in Fig. 2.

The parts already described and to be described are mounted upon a suitable support as shown in Fig. 2 and on the opposite end of said support is a crank shaft $d$ having cranks in line with each of the disks $b^3$ and eccentric bands thereon, and each of the cranks is provided with a connecting rod $d^2$, all of which extend toward corresponding disks.

Arranged upon the support between the shafts $a$ and $d$ are a plurality of casings $e$ equal in number to and in line with corresponding disks and connecting rods, the general arrangement being shown in Fig. 1 and the detail structure of one casing in Fig. 2. Each casing has a cylindrical bore entirely therethrough and in which a block $e^2$ in pivotal connection with a corresponding eccentric band is slidable, said block having a piston rod $e^3$ thereon which carries a piston $e^4$ at the end thereof but of slightly less transverse diameter than the block $e^2$, for a reason later shown, and it will be seen that when the block $e^2$, is reciprocated the piston is also, this being in the degree of eccentric adjustment of the eccentric bands.

Pivotally connected with each of the connecting rods $d^2$, is a piston cylinder $f$ which fits closely in the casing bore but slidably, said cylinders being each provided with ports $f^2$ and $f^3$ communicating, respectively, with opposite ends $f^4$ and $f^5$ of a chamber $f^6$ in the casing $e$, and I may, as shown in Fig. 2, continue the said chamber ends around the cylinder $f$, said continuation being shown at $f^1$ and $f^{11}$, and it will be noted that the piston rod $e^3$ passes into the cylinder $f$ and the piston $e^4$ is slidable therein between the ports $f^2$ and $f^3$ this requiring that the piston should be of smaller diameter than the casing bores and than the blocks $e^2$.

The inner sides of the ends of the chamber $f^6$ are ground to form seats $h$ and $h^2$ for valve disks $h^3$ and $h^4$ on a stem $h^5$ common to both, said stem being slidably held on a rack $i$ but maintained in normal relationship therewith by means of coil springs $h^6$, and said rack is enmeshed with a pinion $i^2$ upon a shaft $i^3$ which extends upwardly through the top of the casing and is provided with a crank arm $i^4$ at its upper end in turn connected, by means of a rod $i^5$ with a suitable oscillating device upon the crank shaft $d$. The oscillating devices shown for this purpose each comprise a pair of levers $i^6$ and $i^7$. These levers are located at opposite sides of the shaft $d$ and are each pivotally connected at its lower end to the frame work of the mechanism, and each is connected at its upper end to the corresponding rod $i^5$. As shown the upper end of the lever $i^7$ is pivotally connected to the rod $i^5$, and the upper end of the lever $i^7$ is connected to the rod $i^5$ by a pin and slot connection. Each pair of levers $i^6$ and $i^7$ are simultaneously turned about the pivotal connections to their lower ends, and the rod $i^5$ thereby shifted first in one direction and then in the other by a corresponding lug or projection $d^{10}$ carried by the shaft $d$ which engages the corresponding levers $i^6$ and $i^7$ alternately as the shaft revolves. A spring $i^{10}$ connected to the lever $i^6$ and to the frame work at opposite sides of the pivotal connection to the lower end of the lever tends to hold the parts in the position in which the corresponding rod $i^5$ is at one end or the other of its range of movement.

The casings $e$ are fluid reservoirs, a pipe $i^6$ being provided for each casing having a valve therein to admit the fluid, either by outward pressure or by inward suction when a partial vacuum is created due to leakage or other causes, the intent being to maintain the casings and their contained piston cylinders entirely full at all times, the pistons being free to move in the direction of fluid flow but not in the opposite direction.

Assuming the eccentric disks to be adjusted for some degree of piston movement and the valves $h^3$ and $h^4$ to be in the positions shown; any outward movement of the piston now tends to force the fluid out of the cylinder ahead of said piston but, the valve $h^4$ being closed, this is impossible and the cylinder is moved the same distance and at the same speed as the piston with a consequent effect on the crank shaft $d$, and when the piston is retracted the fluid at the rear of the same is forced out of the cylinder, the spring of the valve $h^4$ being so adjusted as to permit of the fluid forcing it away from its seat, and no effect is had on the cylinder nor upon the crank shaft, hereafter referred to as the driven shaft, and this forward piston effect on the driven shaft continues, by impulses, until the shaft is at dead center at which instant the crank $i^4$ is actuated to rotate the pinion $i^2$ thus throwing the rack $i$ to the right and seating the valve $h^3$ and unseating the valve $h^4$, after which the direction of fluid flow is reversed and the piston draws the cylinder with it as it is retracted, also by impulses, until the opposite dead center of the driven shaft is reached when the valves $h^3$ and $h^4$ are again reversed as also the action on the cylinder, and this continues as long as there is any piston movement, and the length of these impulses is determined by the degree of adjustment of the eccentric disks $b^2$.

If the extreme piston throw is equal to that of the cylinder said cylinder moves with the piston for its full movement in each direction and the speeds of the driving and the driven shafts are alike, the valves $h^3$ and $h^4$ being automatically reversed at the end of each cylinder movement in either direction, but if at the moment the piston throw is less than that of the cylinder, then the driven shaft is actuated by impulses and, by means of the possibility of adjusting the eccentric disks into the full line, concentric, position shown in Fig. 2, no driven shaft actuation is possible regardless of the speed of the driving shaft.

While not absolutely necessary I prefer to arrange a number of the units in series with the cranks of the driven shaft set at different angles, as in the 1—3, 2—4 set of automobile crank shafts whereby there is always a unit in transmitting position, and it will be understood that the relative normal positions of the eccentric disks will be determined by the arrangement of the cranks on the driven shaft.

It will thus be seen that I provide a complemental piston and cylinder action of variable ratios and through the medium of a fluid, the cylinder movement in either direction by the piston being timed by the position of the driven shaft, thus enabling the piston, even with very slight impulses, to effect a complete rotation of the driven shaft, and continue this rotation indefinitely, particularly so when more than one unit is employed, although theoretically this would be possible with but one unit.

My invention renders cylinder and piston valves unnecessary and is thus comparatively inexpensive, and the arrangement of the pistons and cylinders permits the removal from the reservoir bores in a very easy manner, for re-packing, repair, or substitution and, while I have shown the same in its adaptation to power transmissions, I do not limit myself to such use as other uses therefor are in mind at present, and when used as described a very efficient and flexible transmission results which may also dispense with the clutches now employed with frictional, progressive, and selective automobile transmissions.

As stated, no effort has been made to do other than illustrate enough to enable any person skilled in this art to understand the operation and general construction, as any details which I show or might show would be subject to change in the different uses to which I may put the invention and, with a reservation to myself of such changes in and modifications of the same,

What I claim as new and desire to secure by Letters Patent, is:—

1. The combination of a driving element, a driven element, means including a fluid for transmitting motion from one to the other, and external means for sealing said fluid in either of two positions to correspondingly affect the direction of movement of said driven element.

2. The combination of a driving element, a driven element, means including a fluid for transmitting motion from one to the other, and external means for varying the direction of flow of said fluid to vary the direction of movement of said driven element.

3. The combination of a driving element, a driven element, means including a fluid for transmitting motion from one to the other by impulses, and external means for varying the direction of flow of said fluid to vary the direction of movement of said driven element.

4. The combination of a driving element, a driven element, means including a fluid for transmitting motion from one to the other in one direction, and external means for reversing the direction of movement of said driven element at stated periods.

5. The combination of a driving element, a driven element, means including a fluid for transmitting motion from one to the other in one direction, and automatic means for reversing the direction of movement of said driven element at stated periods.

6. The combination of a driving element, a driven element, external means for sealing a predetermined amount of fluid therebetween in one direction of driving element movement to impart motion to said driven element, and said means permitting a free fluid movement in the opposite direction of driving element movement whereby no motion is imparted to said driven element.

7. The combination of a driving element, a driven element, external means for sealing a predetermined amount of fluid therebetween in one direction of driving element movement to impart motion to said driven element, said means permitting a free fluid movement in the opposite direction of driving element movement and means for changing the relationship of the sealed fluid with respect to both elements whereby movement is imparted to said driven element in reverse direction.

8. The combination of a driving shaft, an element in operative connection therewith, a driven shaft, an element in operative connection therewith, means including a fluid for transmitting movement from one element to the other, and external means for sealing said fluid in either of two positions to correspondingly affect the direction of movement of said driven shaft element.

9. The combination of a driving shaft, an element in operative connection therewith, a driven shaft, an element in operative connection therewith, means including a fluid for transmitting movement from one element to the other, and external means for varying the direction of flow of said fluid to vary the direction of movement of said driven shaft element.

10. The combination of a driving shaft, a driven shaft, a connection therebetween comprising two elements with fluid interposed therebetween, a reservoir for said fluid in bulk, means in said reservoir for controlling the direction of fluid flow to correspondingly affect the direction of movement transmitted to the driven shaft element, and means for reversing the action of said control means to correspondingly reverse the direction of movement of said driven shaft element.

11. The combination of a driving shaft, an element in operative connection therewith, a driven shaft, an element in operative connection therewith, means including a fluid for transmitting movement from one element to the other, means external of said elements for sealing said fluid in either of two positions to correspondingly affect the direction of movement of said driven shaft element, and means in operative connection with said driving shaft for arbitrarily varying the degree of movement transmitted to said driven shaft in either direction of movement of said driven shaft element.

12. The combination of a driving element, a driven element, a casing thereover containing a fluid, a valve for sealing a portion of said fluid between said elements to impart motion from one to the other, and means for changing said valve action to correspondingly affect the direction of transmitted movement.

13. The combination of a driving element, a driven element, a casing thereover containing a fluid, a valve for sealing a portion of said fluid between said elements to impart motion from one to the other, and means for varying the degree of transmitted motion, and means for changing said valve action to correspondingly affect the direction of transmitted movement.

14. The combination of a driving shaft, a driven shaft, a connection therebetween comprising a ported cylinder and a piston movable therein, a casing thereover containing a fluid, a valve in said casing for sealing a portion of said fluid on one side of said piston, within said cylinder, to transmit movement from said driving shaft to said driven shaft, and means for changing the valve action to seal the fluid within said cylinder on the opposite side of said piston to reverse the direction of movement.

15. The combination of a driving shaft, a driven shaft, means including a fluid for transmitting movement from one to the other, through one-half rotation of said driven shaft, and automatic means for reversing the action of said transmitting means to complete a full rotation of said driven shaft.

16. The combination of a driving shaft, a driven shaft, means including a fluid for transmitting movement from one to the other, through one-half rotation of said driven shaft, automatic means for reversing the action of said transmitting means to complete a full rotation of said driven shaft, and means for arbitrarily varying the ratio between the rotations of said shafts.

17. The combination of a driving shaft, a driven shaft, means including a fluid for transmitting movement from one to the other, through one-half rotation of said driven shaft, automatic means for reversing the action of said transmitting means to complete a full rotation of said driven shaft, and means for making said driven shaft inoperative during the operation of said driving shaft.

18. The combination of a driving shaft, a driven shaft, means including a fluid for pushing said driven shaft through a half rotation and control means for said fluid to compel said transmitting means to pull said driven shaft through another half rotation to complete a full rotation thereof.

19. The combination of a driving shaft, a driven shaft, means including a fluid for pushing said driven shaft through a half rotation, and automatic control means for said fluid to compel said transmitting means to pull said driven shaft through another half rotation to complete a full rotation.

20. A casing containing fluid and provided with a bore and two chambers in communication therewith, a cylinder movable in said bore and provided with a port communicating with each chamber, a piston movable in said cylinder between said ports, an element connected with said cylinder and an element connected with said piston extending beyond said casing, and a valve adapted to seal fluid in one of said chambers and in said cylinder on one side of said piston.

21. A casing containing fluid and provided with a bore and two chambers in communication therewith, a cylinder movable in said bore and provided with a port communicating with each chamber, a piston movable in said cylinder between said ports, a valve adapted to seal fluid in either of said chambers and in said cylinder on a corresponding side of said piston, and means for actuating said valve to seal said chambers alternately.

22. A casing containing fluid and provided with a bore and two chambers in communication therewith and with each other, a cylinder movable in said bore and provided with two ports each of which is in communication with one of said chambers, a piston movable in said cylinder, a valve for closing communication between said chambers to prevent fluid movement in one direction and seal the fluid in said cylinder on a corresponding side of said piston, and means for actuating said valve to prevent fluid movement in the other direction and seal the fluid in said cylinder on the opposite side of said piston.

23. The combination of a driving shaft, a driven shaft, a connection therebetween to impart motion from one to the other, means for varying the length of said connection in the ratio of the degree of transmitted movement, and means on one of said shafts for varying the length of reciprocation of the portion of said connection, directly connected to the last mentioned shaft, comprising an eccentric disk rotarily adjustable on said shaft, a normally concentric disk carried by said eccentric disk, and means for adjusting said eccentric disk to maintain said normally concentric disk eccentric to said shaft.

In testimony that I claim the foregoing as my invention I have signed my name in presence of the subscribing witnesses this 29th day of October, 1913.

RICHARD S. M. MITCHELL.

Witnesses:
ARTHUR BROCK, Jr.,
J. C. LARSEN.

Copies of this patent may be obtained for five cents each, by addressing the "Commissioner of Patents, Washington, D. C."